United States Patent
Jin et al.

(10) Patent No.: US 11,804,043 B2
(45) Date of Patent: Oct. 31, 2023

(54) DETECTING OBJECTS IN A VIDEO USING ATTENTION MODELS

(71) Applicant: Lemon Inc., Grand Cayman (KY)

(72) Inventors: Xiaojie Jin, Los Angeles, CA (US); Yi-Wen Chen, Los Angeles, CA (US); Xiaohui Shen, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 191 days.

(21) Appl. No.: 17/348,181

(22) Filed: Jun. 15, 2021

(65) Prior Publication Data

US 2022/0398402 A1    Dec. 15, 2022

(51) Int. Cl.
| | |
|---|---|
| *G06K 9/00* | (2022.01) |
| *G06V 20/40* | (2022.01) |
| *G06V 10/46* | (2022.01) |
| *G06F 18/214* | (2023.01) |

(52) U.S. Cl.
CPC ............ *G06V 20/41* (2022.01); *G06F 18/214* (2023.01); *G06V 10/462* (2022.01); *G06V 2201/07* (2022.01)

(58) Field of Classification Search
CPC .... G06V 10/462; G06V 20/46; G06V 10/255; G06V 20/41; G06V 2201/07; G06V 10/44; G06V 10/454; G06V 10/95; G06V 10/806; G06F 18/214; G06N 3/02
See application file for complete search history.

(56) References Cited

U.S. PATENT DOCUMENTS

| | | | | |
|---|---|---|---|---|
| 2020/0175281 | A1* | 6/2020 | Gan | G06V 40/20 |
| 2021/0064931 | A1* | 3/2021 | Yang | G06V 20/46 |

(Continued)

FOREIGN PATENT DOCUMENTS

| | | |
|---|---|---|
| CN | 111523410 A | 8/2020 |
| CN | 112149459 A | 12/2020 |
| CN | 112464851 A | 3/2021 |

OTHER PUBLICATIONS

Lu "See More, Know More: Unsupervised Video Object Segmentation with Co-Attention Siamese Networks", 2019 (Year: 2019).*

(Continued)

*Primary Examiner* — Molly Wilburn
*Assistant Examiner* — Ahmed A Nasher
(74) *Attorney, Agent, or Firm* — BakerHostetler

(57) ABSTRACT

The present disclosure describes techniques of detecting objects in a video. The techniques comprises extracting features from each frame of the video; generating a first attentive feature by applying a first attention model on at least some of features extracted from any particular frame among the plurality of frames, wherein the first attention model identifies correlations between a plurality of locations in the particular frame by computing relationships between any two locations among the plurality of locations; generating a second attentive feature by applying a second attention model on at least one pair of features at different levels selected from the features extracted from the particular frame, wherein the second attention model identifies a correlation between at least one pair of locations corresponding to the at least one pair of features; and generating a representation of an object included in the particular frame.

13 Claims, 11 Drawing Sheets

(56) References Cited

U.S. PATENT DOCUMENTS

2022/0318349 A1* 10/2022 Wasnik .................. G06V 20/46
2022/0383662 A1* 12/2022 Javan Roshtkhari .........................
                                                          G06F 18/214

OTHER PUBLICATIONS

Achanta et al.; "Frequency-tuned salient region detection"; IEEE Conf. on Computer Vision and Pattern Recognition; 2009; 8 pages.
Brox et al.; "Object Segmentation by Long Term Analysis of Point Trajectories"; European Conf. on Computer Vision; 2010; p. 282-295.
Chen et al.; "Rethinking Atrous Convolution for Semantic Image Segmentation"; Computer Vision and Pattern Recognition; 2017; 14 pages.
Chen et al.; "Reverse Attention for Salient Object Detection"; Proceedings of the European Conf. on Computer Vision; 2018; 17 pages.
Cheng et al.; "SegFlow: Joint Learning for Video Object Segmentation and Optical Flow"; Proceeding of the IEEE Int'l Conf. on Computer Vision; 2017; p. 686-695.
Cheng et al.; "Global Contrast Based Salient Region Detection"; IEEE Transactions on Pattern Analysis and Machine Intelligence; vol. 37; 2015; p. 569-582 (contains abstract).
Faisal et al.; "EpO-Net: Exploiting Geometric Constraints on Dense Trajectories for Motion Saliency"; IEEE Winter Conf. on Applications of Computer Vision; 2020; 10 pages.
Fan et al.; "Shifting More Attention to Video Salient Object Detection"; Proceedings of the IEEE/CVF Conf. on Computer Vision and Pattern Recognition; 2019; p. 8554-8564.
He et al.; "Deep Residual Learning for Image Recognition"; Proceedings of the IEEE Conf. on Computer Vision and Pattern Recognition; 2016; p. 770-778.
Fan et al.; "Structure-Measure: A New Way to Evaluate Foreground Maps"; Proceedings of the IEEE Int'l Conf. on Computer Vision; 2017; p. 4548-4557.
Jain et al.; "FusionSeg: Learning to Combine Motion and Appearance for Fully Automatic Segmentation of Generic Objects in Videos"; IEEE Conf. on Computer Vision and Pattern Recognition; 2017; 12 pages.
Ilg et al.; "FlowNet 2.0: Evolution of Optical Flow Estimation With Deep Networks"; Proceedings of the IEEE Conf. on Computer Vision and Pattern Recognition; 2017; p. 2462-2470.
Jiang et al.; "Submodular Salient Region Detection"; Proceedings of the IEEE Conf. on Computer Vision and Pattern Recognition; 2013; p. 2043-2050.
Jin et al.; "Predicting Scene Parsing and Motion Dynamics in the Future"; $31^{st}$ Conf. on NIPS; 2017; 13 pages.
Kalantidis et al.; "Hard Negative Mixing for Contrastive Learning"; $34^{th}$ Conf. on NIPS; 2020; 21 pages.
Keuper et al.; "Motion Trajectory Segmentation via Minimum Cost Multicuts"; Proceedings of the IEEE Int'l Conf. on Computer Vision; 2015; p. 3271-3279.
Khosla et al.; "Supervised Contrastive Learning"; 34th Conf. on NIPS; 2020; 23 pages.
Koh et al.; "Primary Object Segmentation in Videos Based on Region Augmentation and Reduction"; IEEE Conf. on Computer Vision and Pattern Recognition; 2017; p. 3442-3450.
Le et al.; "Deeply Supervised 3D Recurrent FCN for Salient Object Detection in Videos"; BMVC; 2017; 13 pages.
Li et al.; "Flow Guided Recurrent Neural Encoder for Video Salient Object Detection"; Proceedings of the IEEE Conf. on Computer Vision and Pattern Recognition; 2018; p. 3243-3252.
Li et al.; "Motion Guided Attention for Video Salient Object Detection"; Proceedings of the IEEE/CVF Int'l Conf. on Computer Vision; 2019; p. 7274-7283.
Li et al.; "Unsupervised Video Object Segmentation with Motion-based Bilateral Networks"; Proceedings of the European Conf. on Computer Vision; 2018; p. 207-223.
Li et al.; "Contour Knowledge Transfer for Salient Object Detection"; Proceedings of the European Conf. on Computer Vision; 2018; p. 355-370.
Li et al.; "Neural Architecture Search for Lightweight Non-Local Networks"; Proceedings of the IEEE/CVF Conf. on Computer Vision and Pattern Recognition; 2020; p. 10297-10306.
Liu et al.; "PiCANet: Learning Pixel-Wise Contextual Attention for Saliency Detection"; Proceedings of the IEEE Conf. on Computer Vision and Pattern Recognition; 2018; p. 3089-3098.
Lu et al.; "See More, Know More: Unsupervised Video Object Segmentation With Co-Attention Siamese Networks"; Proceedings of the IEEE/CVF Conf. on Computer Vision and Pattern Recognition; 2019; p. 3623-3632.
Min et al.; "TASED-Net: Temporally-Aggregating Spatial Encoder-Decoder Network for Video Saliency Detection"; Proceedings of the IEEE/CVF Int'l Conf. on Computer Vision; 2019; p. 2394-2403.
Ochs et al.; "Object segmentation in video: A hierarchical variational approach for turning point trajectories into dense regions"; Int'l Conf. on Computer Vision; 2011; 8 pages.
Papazoglou et al.; "Fast Object Segmentation in Unconstrained Video"; Proceedings of the IEEE Int'l Conf. on Computer Vision; 2013; p. 1777-1784.
Perazzi et al.; "A Benchmark Dataset and Evaluation Methodology for Video Object Segmentation"; Proceedings of the IEEE Conf. on Computer Vision and Pattern Recognition; 2016; p. 724-732.
Perazzi et al.; "Fully Connected Object Proposals for Video Segmentation"; Proceedings of the IEEE Int'l Conf. on Computer Vision; 2015; p. 3227-3234.
Siam et al.; "Video Object Segmentation using Teacher-Student Adaptation in a Human Robot Interaction (HRI) Setting"; Int'l Conf. on Robotics and Automation; 2019; 7 pages.
Song et al.; "Pyramid Dilated Deeper ConvLSTM for Video Salient Object Detection"; Proceedings of the European Conf. on Computer Vision; 2018; p. 715-731.
Tokmakov et al.; "Learning Motion Patterns in Videos"; Computer Vision and Pattern Recognition; 2017; p. 3386-3394.
Van den Oord et al.; "Representation Learning with Contrastive Predictive Coding"; Machine Learning; 2018; 13 pages.
Wang et al.; "Detect Globally, Refine Locally: A Novel Approach to Saliency Detection"; Proceedings of the IEEE Conf. on Computer Vision and Pattern Recognition; 2018; p. 3127-3135.
Wang et al.; "Zero-Shot Video Object Segmentation via Attentive Graph Neural Networks"; IEEE/CVF Int'l Conf. on Computer Vision; 2019; p. 9236-9245.
Wang et al.; "Revisiting Video Saliency: A Large-Scale Benchmark and a New Model"; Conf. on Computer Vision and Pattern Recognition; 2018; p. 4894-4903.
Wang et al.; "Consistent Video Saliency Using Local Gradient Flow Optimization and Global Refinement"; IEEE Transactions on Image Processing; vol. 24; Nov. 2015; p. 4185-4196.
Wang et al.; "Video Salient Object Detection via Fully Convolutional Networks"; IEEE Transactions on Image Processing; vol. 27; 2018; p. 38-49.
Wang et al.; "Learning Unsupervised Video Object Segmentation Through Visual Attention"; Proceedings of the IEEE/CVF Conf. on Computer Vision and Pattern Recognition; 2019; p. 3064-3074.
Wang et al.; "Non-Local Neural Networks"; Proceedings on the IEEE Conf. on Computer Vision and Pattern Recognition; 2018; p. 7794-7803.
Yang et al.; "Saliency Detection via Graph-Based Manifold Ranking"; Proceedings of the IEEE Conf. on Computer Vision and Pattern Recognition; 2013; p. 3166-3173.
Yang et al; "Anchor Diffusion for Unsupervised Video Object Segmentation"; Proceedings of the IEEE/CVF Int'l Conf. on Computer Vision; 2019; p. 931-940.
Zhen et al.; "Learning Discriminative Feature with CRF for Unsupervised Video Object Segmentation"; European Conf. on Computer Vision; 2020; p. 445-462.
Zhou et al.; "Motion-Attentive Transition for Zero-Shot Video Object Segmentation"; $34^{th}$ Proceedings of the AAAI Conf. on Artificial Intelligence; vol. 34; 2020; p. 13066-13073.

(56) References Cited

OTHER PUBLICATIONS

International Patent Application No. PCT/SG2022/050344; Int'l Written Opinion and Search Report; dated Dec. 28, 2022; 7 pages.

* cited by examiner

| Method | Year | DAVIS | | | FBMS | | | ViSal | | |
|---|---|---|---|---|---|---|---|---|---|---|
| | | maxF↑ | S↑ | MAE↓ | maxF↑ | S↑ | MAE↓ | maxF↑ | S↑ | MAE↓ |
| C2SNet [23] | ECCV'18 | 0.771 | 0.813 | 0.052 | 0.782 | 0.811 | 0.073 | 0.924 | 0.922 | 0.023 |
| RAS [4] | ECCV'18 | 0.729 | 0.785 | 0.057 | 0.807 | 0.816 | 0.078 | 0.925 | 0.930 | 0.019 |
| DGRL [36] | ECCV'18 | 0.763 | 0.812 | 0.056 | 0.802 | 0.829 | 0.057 | 0.917 | 0.916 | 0.022 |
| PiCANet [25] | CVPR'18 | 0.801 | 0.842 | 0.044 | 0.819 | 0.845 | 0.059 | 0.932 | 0.937 | 0.022 |
| FCNS [40] | TIP'18 | 0.708 | 0.794 | 0.061 | 0.759 | 0.794 | 0.091 | 0.852 | 0.881 | 0.048 |
| FGRNE [20] | CVPR'18 | 0.798 | 0.838 | 0.032 | 0.783 | 0.809 | 0.083 | 0.848 | 0.861 | 0.045 |
| MBN [22] | ECCV'18 | 0.861 | 0.887 | 0.031 | 0.816 | 0.857 | 0.047 | 0.883 | 0.898 | 0.020 |
| PDB [33] | ECCV'18 | 0.849 | 0.882 | 0.030 | 0.815 | 0.851 | 0.069 | 0.917 | 0.907 | 0.022 |
| SSAV [9] | CVPR'19 | 0.861 | 0.893 | 0.028 | 0.865 | 0.879 | 0.040 | 0.939 | 0.943 | 0.020 |
| AnDiff [44] | ICCV'19 | 0.808 | - | 0.044 | 0.812 | - | 0.064 | 0.904 | - | 0.030 |
| MGA [21] | ICCV'19 | 0.902 | 0.913 | 0.022 | 0.910 | 0.907 | 0.027 | 0.947 | 0.944 | 0.015 |
| DFNet [45] | ECCV'20 | 0.899 | - | 0.018 | 0.833 | - | 0.054 | 0.927 | - | 0.017 |
| Ours | | 0.909 | 0.918 | 0.015 | 0.915 | 0.909 | 0.026 | 0.951 | 0.947 | 0.013 |

FIG. 7

| Method | Year | DAVIS | |
|---|---|---|---|
| | | $\mathcal{J}$ Mean ↑ | $\mathcal{F}$ Mean ↑ |
| MBN [22] | ECCV'18 | 80.4 | 78.5 |
| MotAdapt [32] | ICRA'19 | 77.2 | 77.4 |
| AGS [41] | CVPR'19 | 79.7 | 77.4 |
| COSNet [26] | CVPR'19 | 80.5 | 79.4 |
| AGNN [37] | ICCV'19 | 80.7 | 79.1 |
| AnDiff [44] | ICCV'19 | 81.7 | 80.5 |
| MGA [21] | ICCV'19 | 81.4 | 81.0 |
| EpO+ [7] | WACV'20 | 80.6 | 75.5 |
| MATNet [46] | AAAI'20 | 82.4 | 80.7 |
| DFNet [45] | ECCV'20 | 83.4 | 81.8 |
| Ours | | 83.5 | 82.0 |

FIG. 9

DETECTING OBJECTS IN A VIDEO USING ATTENTION MODELS

BACKGROUND

Object detection is a computer vision technique that enables to identify and locate objects in an image or a video. The most pioneering work in the field of computer vision have mostly tackled image processing. However, the video processing field has been less deeply explored due to the complexity of video data and the high computational cost. Improvements in techniques of detecting objects in a video are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 7 shows an example table illustrating a comparison of the performance of the techniques described in the present disclosure and existing techniques.

FIG. 9 shows an example table depicting a comparison of the performance of various models, including models in accordance with the present disclosure, on an unsupervised video object segmentation task.

DETAILED DESCRIPTION OF ILLUSTRATIVE EMBODIMENTS

Figure 1:
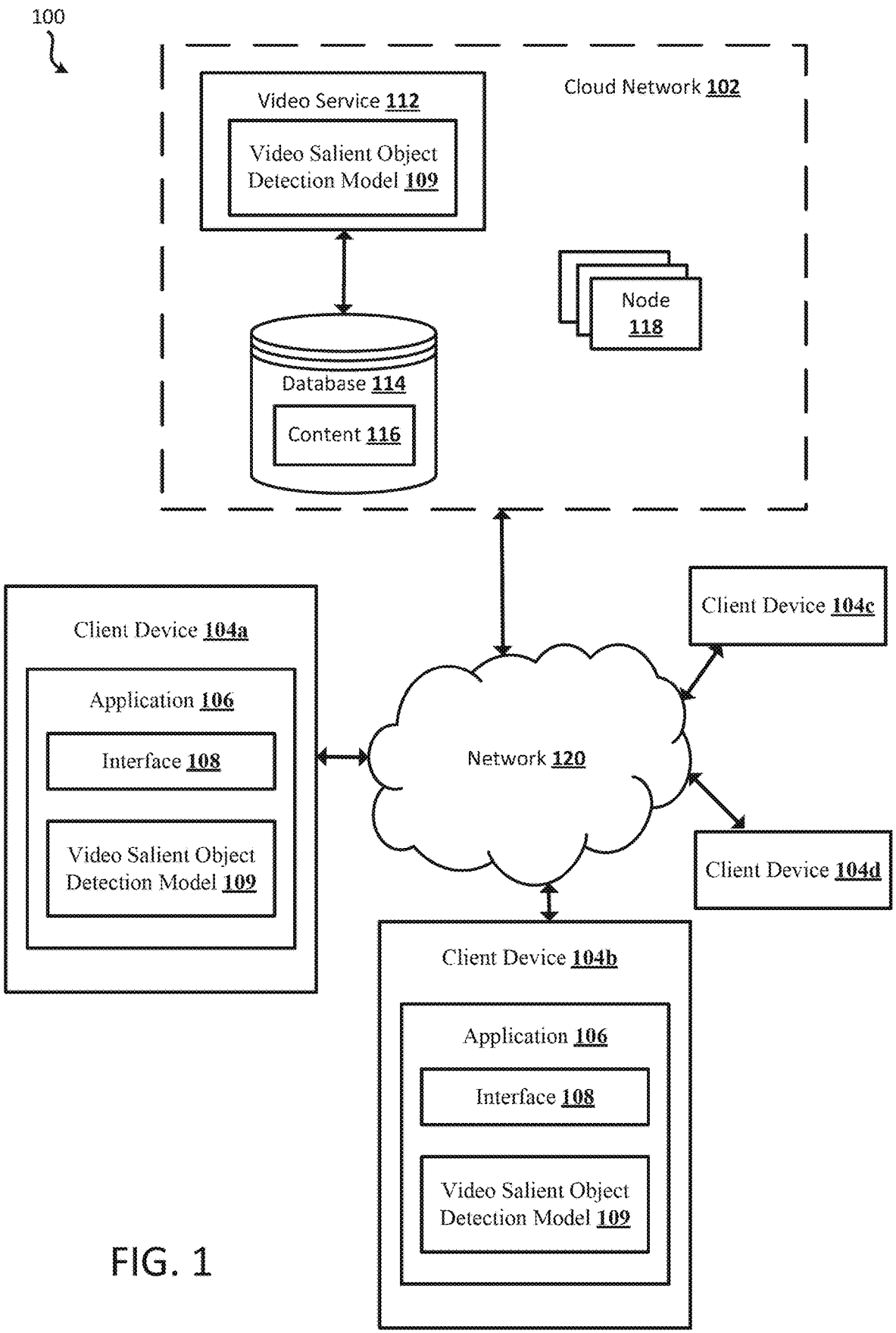
FIG. 1 shows an example system for distributing video content.

Video object detection, e.g., video salient object detection (VSOD), aims to locate or extract the most visually attractive or attention-grabbing objects in a video. VSOD may be useful for a variety of different fundamental techniques in computer vision and various applications. For example, VSOD may be useful for video object segmentation, visual object tracking, and/or video editing. However, existing VSOD techniques may not perform well or they may involve a high computational cost.

Existing video salient object detection (VSOD) techniques extract hand-crafted low-level features from both spatial and temporal dimensions then integrate these features together. Low-level features include, for example, color-based features, texture-based features, and shape-based features. These existing VSOD techniques distinguish the salient objects from the background regions using classic heuristics, such as color contrast, background prior, and/or center prior. These existing VSOD techniques may utilize optical flow for exploring temporal information. However, the performance of these existing VSOD techniques may be limited by the representation ability of the low-level features. Additionally, the computational cost associated with optical flow may be high.

More recent VSOD techniques utilize convolutional neural network (CNN) based models. For example, the fully convolution networks (FCNs) method employs a single FCN for a single frame saliency prediction, and another FCN that receives, as input, the initial saliency map and the consecutive frame pairs and models the temporal information. As another example, some approaches model the spatiotemporal information using 3-D convolutional filters, a recurrent neural network for spatiotemporal prediction (e.g. ConvLSTM), and/or jointly considering appearance and optical flow in the framework. These CNN-based models may achieve better results. However, these CNN-based models may require high computational cost. For example, these CNN-based models may require high computational cost for modeling temporal information. Additionally, these CNN-based models may accumulate errors over time due to the temporal dependencies being limited in short time intervals. Accordingly, an improved technique for VSOD is desirable.

An improved VSOD technique may utilize an end-to-end trainable framework. The framework of the VSOD model may include two attention models (e.g. sub-networks) for aggregating features. Attention models are used to make a CNN learn and focus more on the important information, rather than learning non-useful background information. In the case of VSOD, useful information may the salient object that the VSOD model is attempting to classify and localize in the video. An attention model may include a simple 2D-convolutional layer, a multilayer perceptron (MLP), and a sigmoid function at the end to generate a mask of the input feature map.

The first attention model may capture global information in an image or video frame. Global features describe the entire image, whereas local features describe the image/video frame patches (e.g. small groups of pixels in the image or video frame). Local features refer to a pattern or distinct structure found in an image or video frame, such as a point, edge, or small image patch; they are usually associated with an image patch that differs from its immediate surroundings by texture, color, or intensity.

The first attention model may be a non-local self-attention model. A non-local self-attention model may capture long-range (e.g. long distance) spatiotemporal dependencies in images or videos by directly computing the interactions between any two positions in the images or video frames. Capturing long-range dependencies is of central importance for deep neural networks. Conventional and recurrent operations both process a local neighborhood, and as a result, long-range dependencies may be captured only when these operations are applied repeatedly. However, repeating these operations repeatedly is computationally inefficient and causes optimization difficulties. A non-local model may be a more efficient and simpler component for capturing long-range dependencies in the video frames. The non-local self-attention mechanism allows the inputs to interact with each other ("self") and find out what should be paid more attention to ("attention"). The outputs are aggregates of the interactions and attention scores.

The second attention sub-network may be a cross-level co-attention model. A cross-level co-attention model may enable the learning of pairwise attentions. The cross-level co-attention model may compute the correlation(s) between low-level and high-level features. As discussed above, low-level features include color-based features, texture-based features, and shape-based features. High-level features may include semantic features, such as a center point associated with a particular object (e.g. the salient object). Computing the correlation between high-level and low-level features may help the VSOD model to focus on the most distinct regions in the scene while maintaining the high-resolution outputs. For example, high resolution details may be able to be incorporated into the semantic features.

The framework of the VSOD model may include a contrastive learning technique. Contrastive learning is a machine learning technique used to learn the general features of a dataset without labels by teaching the model which data points are similar or different. Using this approach, one can train a machine learning model to classify between similar and dissimilar images. The inner working of contrastive learning can be formulated as a score function, which is a metric that measures the similarity between two features.

The contrastive learning technique may help the VSOD model to learn contrastive features between foreground and background regions in the video frames. The foreground regions in the same video may be more likely to share similar features, while foreground regions and background regions may be more likely to share different features. Accordingly, for each foreground region anchor, the foreground regions in the same video frame may be selected as positive samples and the background regions may be selected as negative samples. The objective of the contrastive loss is to minimize the distance between the anchor and positive samples in embedding space while maximizing the distance between the anchor and negative samples. By selecting samples from the entire video, the framework may learn features with better intra-frame discriminability and inter-frame consistency.

The VSOD model as described in the present disclosure may be utilized for a variety of different reasons in a variety of different systems. For example, the VSOD model may be utilized for video segmentation, visual object tracking, and/or video editing within a system for distributing content, such as video content. FIG. 1 illustrates an example system 100 for distributing content. The system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a video service 112. The video service 112 may comprise a content streaming service, such as an Internet protocol video streaming service. The video service 112 may be configured to distribute content 116 via a variety of transmission techniques. The video service 112 is configured to provide the content 116, such as video, audio, textual data, a combination thereof, and/or the like. The content 116 may comprise content streams (e.g., video stream, audio stream, information stream), content files (e.g., video file, audio file, text file), and/or other data. The content 116 may be stored in a database 114. For example, the video service 112 may comprise a video sharing service, a video hosting platform, a content distribution platform, a collaborative gaming platform, and/or the like.

In an embodiment, the content 116 may be output to different client devices 104 via the network 120. The content 116 may be streamed to the client devices 104. The content stream may be a stream of videos received from the video service 112. The plurality of client devices 104 may be configured to access the content 116 from the video service 112. In an embodiment, a client device 104 may comprise a content application 106. The content application 106 outputs (e.g., display, render, present) the content 116 to a user associated with the client device 104. The content may comprise videos, audio, comments, textual data and/or the like.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

The video service 112 may be configured to receive input from users. The users may be registered as users of the video service 112 and may be users of the content application 106 operating on client devices 104. The user input data may include information, such as videos and/or user comments, that the users connected to the video service 112 want to share with other connected users of the video service 112. The video service 112 may be able to receive different types of input from users using different types of client devices 104. For example, a user using the content application 106 on a first user device, such as a mobile phone or tablet, may be able to create and upload videos using the content application 106.

In an embodiment, a user may use the content application 106 on a client device 104 to create a video and upload the video to the cloud network 102. The client devices 104 may access an interface 108 of the content application 106. The interface 108 may comprise an input element. For example, the input element may be configured to allow users to create the video. To create the video, the user may give the content application 106 permission to access an image capture device, such as a camera, or a microphone of the client device 104.

The video service 112 may be configured to output the uploaded videos and user input to other users. The users may be registered as users of the video service 112 to view videos created by other users. The users may be users of the content application 106 operating on client devices 104. The content application 106 may output (display, render, present) the videos and user comments to a user associated with a client device 104. The client devices 104 may access an interface 108 of the content application 106. The interface 108 may comprise an output element. The output element may be configured to display information about different videos so that a user can select a video to view. For example, the output element may be configured to display a plurality of cover images, captions, or hashtags associated with the videos. The output element may also be configured to arrange the videos according to a category associated with each video.

In an embodiment, the user comments associated with a video may be output to other users watching the same video. For example, all users accessing a video may view comments associated with the video. The video service 112 may output the video and the associated comments simultaneously. Comments may be output by the video service 112 in real-time or near-real-time. The content application 106 may display the videos and comments in various ways on the client device 104. For example, the comments may be displayed in an overlay above the content or in an overlay beside the content. As another example, a user that wants to view other users' comments associated with a video may need to select a button in order to view the comments. The comments may be animated when displayed. For example, the comments may be shown scrolling across the video or across the overlay.

The plurality of computing nodes 118 may process tasks associated with the video service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, at least one of the video service 112 or the client devices 104 comprise a VSOD model 109. The VSOD model 109 may be utilized, at least in part, to perform video object segmentation, visual object tracking, and/or video editing. The VSOD model 109 may be utilized, for example, to perform video object segmentation, visual object tracking, and/or video editing during the creation of a video, such as a short video, before it is uploaded to the video service 112. Additionally, or alternatively, the VSOD model 109 may be utilized, to perform video object segmentation, visual object tracking, and/or video editing and/or after creation and/or uploading of the video to the video service 112.

In an embodiment, the VSOD model 109 utilize a framework that includes two attention models (e.g. sub-networks) for aggregating features. The first attention model may be a non-local self-attention model and may capture long-range (e.g. long distance) dependencies in the video frames by directly computing the interactions between any two positions in the video frames. The second attention model may be a cross-level co-attention model that computes the correlation between high-level and low-level features in video frames. The framework utilized by the VSOD model 109 may additionally include a contrastive learning model. The contrastive learning model may help the VSOD model 109 to learn contrastive features between foreground and background regions in the video frames.

Figure 2:
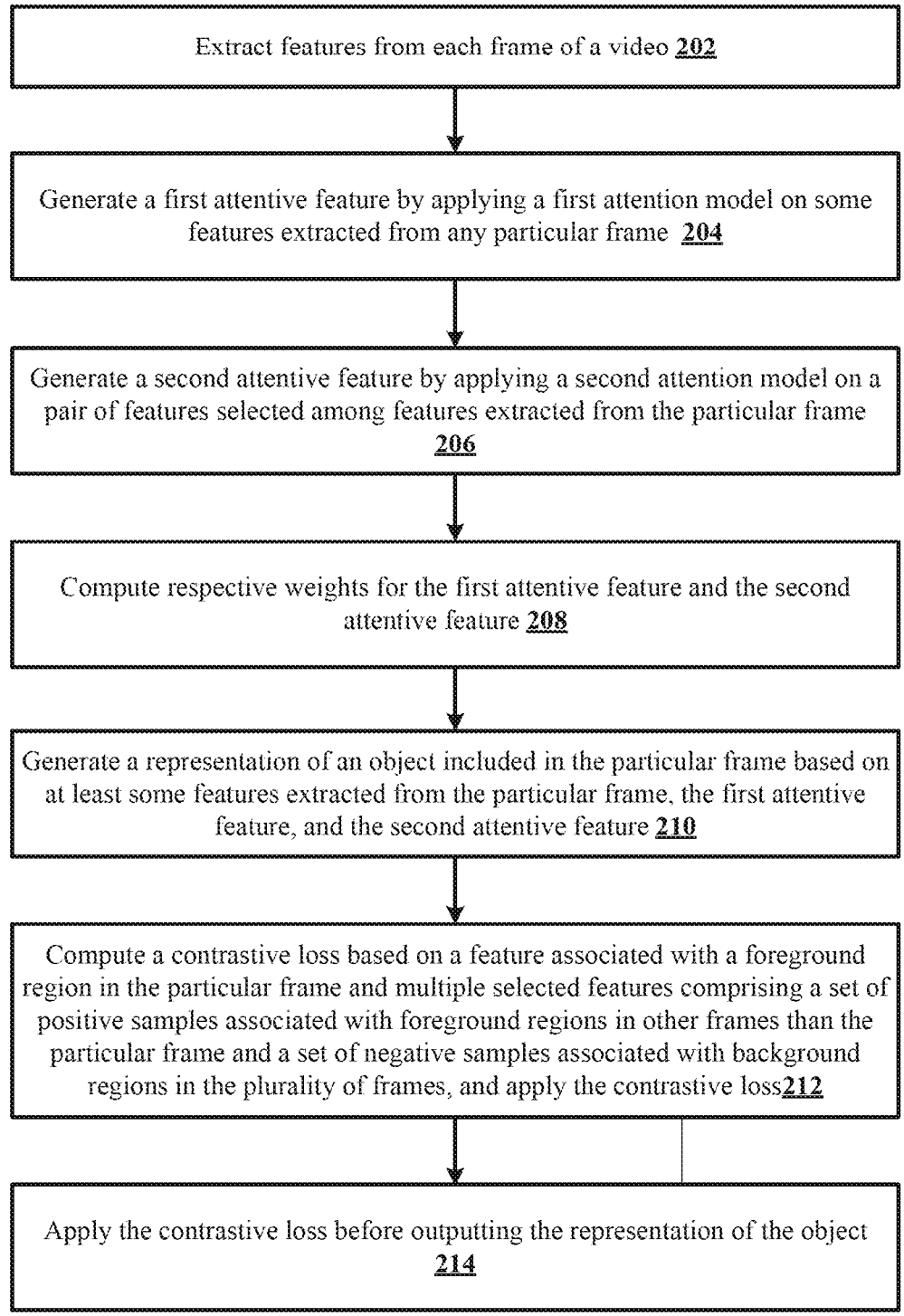
FIG. 2 shows an example method for detecting objects in a video.

FIG. 2 illustrates an example process 200 performed by a VSOD model (e.g. VSOD model 109). The VSOD model 109 may perform the process 200 to detect a salient object in a video, such as a video created for upload to the video service 112. Although depicted as a sequence of operations in FIG. 2, those of ordinary skill in the art will appreciate that various embodiments may add, remove, reorder, or modify the depicted operations.

The VSOD model may be used to locate or extract the most visually attractive or attention-grabbing object (e.g. salient object) in a video. The video may comprise a plurality of frames. At 202, features may be extracted from each frame of the video. Any particular frame of the video may comprise an object, such as a salient object. The features extracted from a particular frame may include high-level features and low-level features. As discussed above, low-level features include, for example, color-based features, texture-based features, and shape-based features. High-level features include semantic features, such as a center point associated with a particular object (e.g. the salient object).

Low-level features may be extracted using image processing algorithms. These algorithms are concerned with finding corresponding points between images and/or finding edges or lines in an image. In addition, these algorithms may find pixel intensities or certain colors within an image.

High-level features may be extracted using machine learning algorithms. These algorithms are concerned with the interpretation or classification of a scene as a whole. Things like classification of human actions, object detection and recognition and so on. These algorithms are concerned with training a system to recognize or classify something, then when unknown input is provided to the trained system, the trained system can determine what is happening in the scene or locate a region of interest where it detects an action.

At 204, a first attentive feature may be generated by applying the first attention model on at least some of features extracted from a particular frame. The at least some features extracted from the particular frame may be one or more high-level features of the particular frame.

The first attention model may be a non-local, self-attention model. The first attention model identifies correlations between a plurality of locations in the particular frame by computing relationships between any two locations among the plurality of locations. As discussed above, a non-local self-attention model may capture long-range (e.g. long distance) spatiotemporal dependencies in an image or video frame by directly computing the interactions between any two locations in the image or video frame. The non-local self-attention mechanism allows the inputs to interact with each other ("self") and find out what should be paid more attention to ("attention"). The outputs are aggregates of these interactions and attention scores. For example, the non-local self-attention model may capture long-range (e.g. long distance) spatiotemporal dependencies in the particular frame by directly computing the interactions between any two locations in the particular frame. The first attention model may use, as input, high-level feature(s) extracted from the particular frame, to generate and output the first attentive feature. The first attentive feature may be, for example, a non-local self-attentive feature associated with the particular frame.

At 206, the second attentive feature may be generated by applying the second attention model on at least one pair of features extracted from the particular frame. The second attention model identifies a correlation between features at different levels. The pair of features comprise a high-level feature and a low-level feature that are extracted from the particular frame.

The second attention model may be cross-level co-attention model. As discussed above, the cross-level co-attention model may enable the learning of pairwise attentions. The cross-level co-attention model may compute the correlation (s) between low-level and high-level features, such as in a video frame. For example, the second attention model may capture correspondence between low-level and high-level features in the particular frame. The second attention model may determine a similarity between a pair of locations in the low-level feature and the high-level feature. The second attention model may use, as input, the pair of feature comprising a high level feature and a low-level feature, to generate and output the second attentive feature. The second attentive feature may be, for example, a cross-level co-attentive feature associated with the particular frame.

The attentive features output by the first attention model and the second attention model, such as the first and second attentive features, may be aggregated and fed into a detection model. To aggregate the attentive features, the first and second attentive features as well as the high-level feature extracted from the particular frame may be concatenated. Due to variations between video frames, the importance of features (e.g. the first and second attentive features) may vary in different video frames. Accordingly, the first attentive feature and the second attentive feature may be weighted by a gating function, respectively.

The gated aggregation mechanism/function may determine a weight for each of the first and second attentive features. At 208, respective weights for the first attentive feature and the second attentive feature may be computed. The corresponding weight may be indicative of the importance of the first or second attentive feature in the particular frame (e.g. the corresponding weight may represent the portion of information that will remain in the first or second attentive feature). The first and second weights may be the same or may be different. To generate the weight for each of the first and second attentive features, a single convolutional layer may be utilized. The respective weights may be utilized to determine first and second weighted attentive features.

After the first and second weighted attentive features are determined, the original high-level feature extracted from the particular frame, the first weighted attentive feature, and the second weighted attentive feature may be concatenated. At 210, a representation of the object in the particular frame may be generated based at least on the high-level feature, the first attentive feature, and the second attentive feature. For example, the representation of the object may be generated based on the concatenation of the high-first feature, the first weighted attentive feature, and the second weighted attentive feature. The representation may be, for example, a saliency map. The saliency map may be a topographical representation of the unique features (e.g. the salient object) in the particular frame. The above process may be repeated for all (or some) of the other frames of the video.

Optionally, information in the entire video may be explored in order to improve both intra-frame discriminability and inter-frame consistency. To do so, a contrastive learning technique may be used. At 212, a contrastive loss may be computed based on a feature associated with a foreground region in the particular frame and multiple features selected among features extracted from the plurality of frames. The contrastive loss may be applied before outputting the representation so as to improve the temporal consistency across the plurality of frames. For each frame of the plurality of frames, it may be determined whether each of the extracted features is associated with a foreground region or a background region in a corresponding frame.

Each extracted feature associated with the foreground region of the particular frame may be, for example, an anchor. For each extracted feature associated with the foreground region of the particular frame (e.g. for each anchor), a plurality of positive samples and a plurality of negative samples may be selected. For each anchor, foreground regions from other frames of the video may be selected as positive samples and background regions from either the particular frame or the other frames of the video may be selected as negative samples. The anchors, positive samples, and negative samples may be utilized to determine a contrastive loss associated with the video. At 214, the contrastive loss may be applied before output of the representation of the object.

Figure 3:
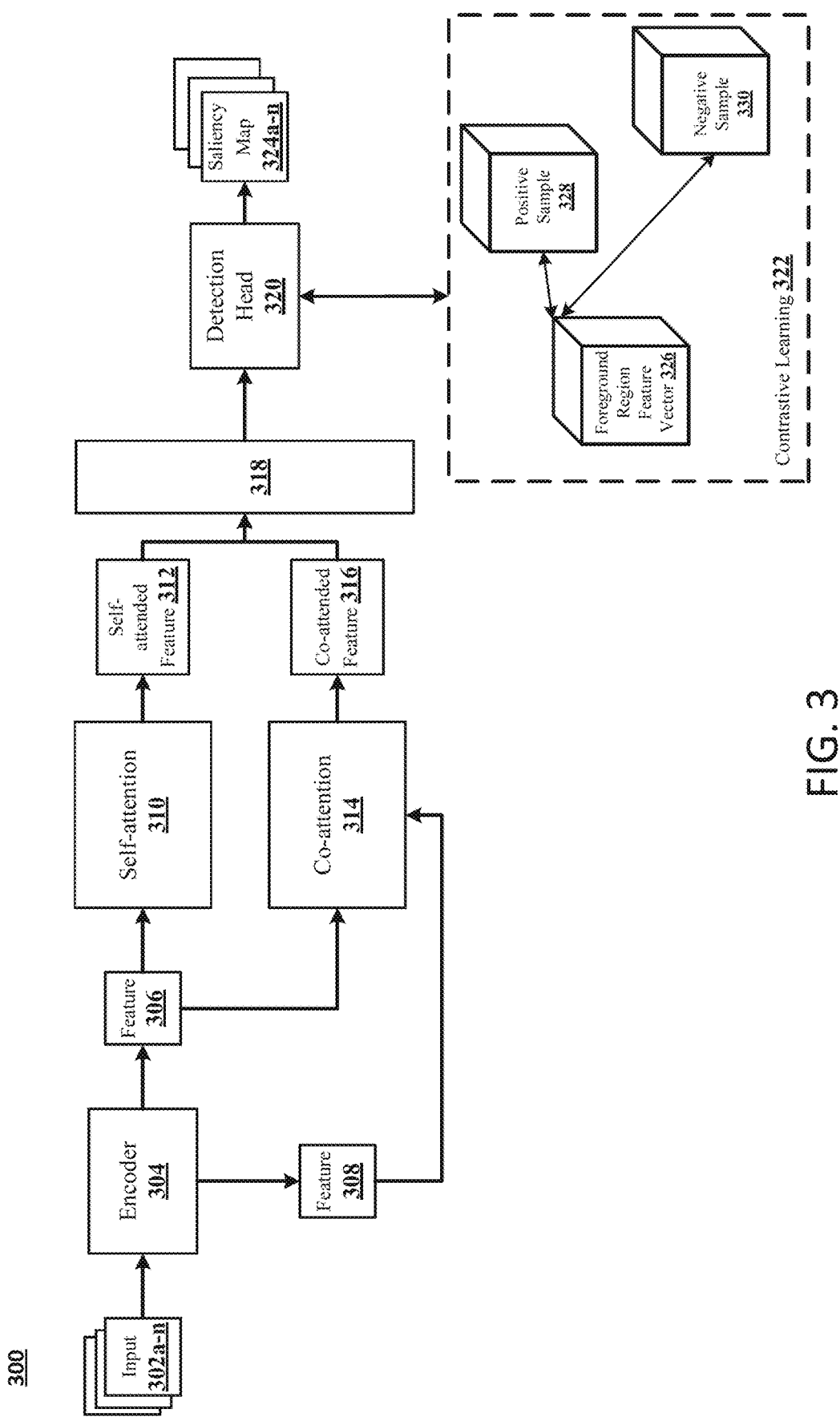
FIG. 3 shows an example system for detecting objects in a video.

An exemplary framework 300 that may be utilized by a VSOD model, such as the VSOD model 109, is depicted in FIG. 3. The framework 300 includes at least one encoder 304, a self-attention model 310, a co-attention model 314, a detection head 320, an aggregation model 318, and a contrastive learning model 322. The VSOD model may receive input 302*a-n*. The input 302*a-n* may include one or more frames of a video. For example, an input video may have n frames, and input 302*a* may include a particular frame of the input video, input 302*b* may include a second frame of the same video, input 302*n* may include the last frame of the same video, etc. The number of frames received as input may include all or some of the frames included in a particular video.

The at least one encoder 304 may be a feature encoder. The at least one encoder 304 may receive one or more input video frames 302*a-n*. For example, the at least one encoder 304 may receive some or all of the video frames included in a particular video. The at least one encoder 304 may, for each input video frame 302*a-n*, extract a feature representation of the input frame. For example, the at least one encoder 304 may extract a high-level feature, such as the feature 306. Another encoder may extract a low-level feature, such as the feature 308, from each input frame. The extracted feature representations of each input frame may be fed into the self-attention model 310 and the co-attention model 314.

The self-attention model 310 and the co-attention model 314 may receive one or more of the extracted feature representations of each input frame from the at least one encoder 304. The self-attention model 310 and the co-attention model 314 may utilize the extracted feature representation(s) to determine attentive features. For example, the self-attention model 310 may receive the high-level extracted feature representation 306 and may utilize the high-level extracted feature representation 306 to determine and output an attentive feature 312. In an embodiment, the self-attention model 310 is a non-local self-attention model configured to find correlations between all positions in a particular video frame. An exemplary non-local self-attention model configured to find correlations between all positions in a particular video frame is discussed below in more detail, with reference to FIG. 4.

The co-attention model 314 may receive both the high-level extracted feature representation 306 and the low-level extracted feature representation 308 and may utilize the high-level extracted feature representation 306 and the low-level extracted feature representation 308 to determine and output an attentive feature 316. The co-attention model 314 may be configured to detect the salient object(s) in a video using high-level semantic features while keeping the details from low-level features.

The co-attention model 314 may explore the relationships between high-level extracted features, such as the feature 306, and the low-level extracted features, such as the feature 308. The feature 306 and the feature 308 may be of different sizes. The co-attention model 314 may include a convolutional layer configured to make the features 306 and 308 the same size as each other. An affinity matrix may then be computed from the features 306 and 308. For example, the affinity matrix may be computed based on the following:

$$A = vWx^T,\qquad\text{Equation 1}$$

wherein x is a high-level feature extracted from a particular frame, such as the feature 306, v is a low-level feature extracted from the particular frame, such as the feature 308, W is a learnable weight matrix. A is an affinity matrix, and each entry of A indicates the similarity between a pair of locations in the low-level feature 306 and the high-level feature 308. T represents a transpose operation. The low-level feature 306 and the high-level feature 308 may be of a shape (h, w, c), wherein h, w, and c denote the height, width, and number of channels, respectively, The features may be reshaped to (h×w, c) before matrix multiplications are performed.

The attentive feature 316 may be generated based on the affinity matrix and the original high-level feature 308. For example, the attentive feature 316 may generated from the affinity matrix A and the original high-level feature x based on $Z_{co\text{-}attn}$=softmax (A)x. The softmax function (e.g. the normalized exponential function) takes as input a vector z of K real numbers and normalizes it into a probability distribution consisting of K probabilities proportional to the exponentials of the input numbers. That is, prior to applying softmax, some vector components could be negative, or greater than one; and might not sum to 1. After applying softmax, each component will be in the interval (0,1) and the components will add up to 1, so that they may be interpreted as probabilities. As the co-attention model 314 is a cross-level co-attention sub-network, the attentive feature 316 generated based on the affinity matrix and the original high-level feature 308 may be a co-attentive feature.

The attentive features 312 and 316 output by the self-attention model 310 and the co-attention model 314 may be aggregated by the aggregation model 318 and fed into the detection head 320. To aggregate the attentive features 312 and 316, the attentive features 312 and 316 and the original high-level extracted feature representation 306 may be concatenated. Due to variations between video frames, the importance of the three features (e.g. the attentive features 312 and 316 and the original high-level extracted feature representation 306) may vary in different video frames. Accordingly, instead of directly concatenating the three features, a gated aggregation mechanism/function may be utilized to dynamically combine the three features. To generate a weight for each of the three attentive features 312 and 316, a single convolutional layer may be utilized. For example, the operation may be as follows:

$$f_g = \sigma(W_g z + b_g),\qquad\text{Equation 2}$$

wherein σ is the sigmoid function with an output range [0,1], $W_g$ and $b_g$ are the weight and bias of the convolutional layer, respectively, and $f_g$ is the weight for the attentive feature representing the portion of information that will remain in the feature. The weighted feature may then be obtained using the following:

$$\tilde{z} = f_g \odot z,\qquad\text{Equation 3}$$

wherein ⊙ denotes the element-wise multiplication. The gating operation is applied on the attentive features 312 and 316 separately. Then, after the gating operation is applied on the attentive features 312 and 316, the weighted attentive features 312 and 316 may be concatenated along with the original high-level extracted feature representation 306.

The detection head 320 receives the concatenation of the weighted attentive features 312 and 316 and the original high-level extracted feature representation 306 and utilizes the concatenation to generate one or more saliency maps 324a-n.

The detection head 320 may apply a contrastive loss on the features before outputting the one or more saliency maps 324a-n. The contrastive loss may, for example, be determined by the contrastive learning model 322. The contrastive learning model 322 may be configured to improve intra-frame discriminability and/or inter-frame consistency. For example, the contrastive learning model 322 may optimize contrastive loss in order to make foreground regions in the same video close to each other and far away from background regions in the embedding space.

The contrastive learning model 322 may include a foreground region feature vector 326. The foreground region feature vector 326 may be an anchor foreground region in a video frame. Other foreground regions in the same video frame may be selected as positive samples. For example, a positive sample 328 may be selected from the foreground region in the same video frame as the foreground region feature vector 326 was selected from. Background regions in the same video frame may be selected as negative samples. For example, a negative sample 330 may be selected from the background region in the same video frame as the foreground region feature vector 326 was selected from. The contrastive learning model 322 may optimize contrastive loss in order to make foreground region feature vector 326 and the positive sample 328 close to each other and far away from background regions, such as the negative sample 330, in the embedding space. Positive and negative samples may be chosen from the entire video (e.g. from each frame in a video) in order improve the intra-frame discriminability and/or inter-frame consistency. Multiple positive and negative samples for each anchor may be selected in order to improve the sampling efficiency For an input video, the extracted features of each frame are separated into foreground and background using the ground truth masks. Then, for each foreground region as an anchor, such as the foreground region feature vector 326, a plurality of other foreground regions from other frames of the same video may be selected to form positive samples (e.g. positive sample 328) and a plurality of background regions from the same video may be selected to form negative samples (e.g. negative sample 330). The foreground region feature vector 326, positive sample 328, and negative sample 330 may be feature vectors formed by performing global average pooling on the features within the defined regions. The contrastive loss may be computed based on:

$$L_{cl} = -\log \frac{\sum_{\mu_+ \in Q_+} e^{\mu^T \mu_+/\tau}}{\sum_{\mu_+ \in Q_+} e^{\mu^T \mu_+/\tau} + \sum_{\mu_- \in Q_-} e^{\mu^T \mu_-/\tau}},$$ Equation 4 wherein $L_{cl}$ represents the contrastive loss, $\mu$ represents the feature associated with a foreground region in a particular frame of a video, $Q_+$ represents a set of positive samples associated with foreground regions in other frames than the particular frame, $Q_-$ represents a set of negative samples associated with background regions in the plurality of frames of the video, $\mu_+$ is a positive sample, $\mu_-$ is a negative sample, and $\tau$ is the temperature parameter.

The selection of positive and negative samples is crucial for learning contrastive features effectively. Accordingly, two criteria for mining meaningful positive and negative samples may be employed. First, foreground regions that have low responses in the output of the model may be chosen as hard positives to suppress false negatives. Second, background regions with high responses in the output map may be chosen as hard negatives to deal with false positives. The hard samples may be selected based on the Mean Absolute Error (MAE) between the prediction and the ground truth mask within the foreground or background region. With the meaningful samples chosen from the entire video, the contrastive loss applied within the same frame can help the model distinguish between foreground and background, and the loss enforced across different frames may improve the temporal correspondence.

The VSOD model may output one or more saliency maps 324a-n. Each saliency map 324a-n may correspond to a particular item of input 302a-n. For example, a saliency map 324a may correspond to an input 302a that includes a particular frame of a video, a saliency map 324b may correspond to an input 302b that includes a second frame of the same video, etc. Saliency refers to unique features (pixels, resolution etc.) of the video frame. These unique features depict the visually alluring locations in each video frame. Each saliency map 324a-n may be a topographical representation of the unique features in the corresponding video frame. For example, the saliency map 324a may be a topographical representation of the unique features in the input 302a. An exemplary set of saliency maps is discussed below in more detail, with reference to FIG. 8.

The overall objective of the framework 300 is composed of the binary cross-entropy loss and the contrastive loss defined in Equation 4:

$$L = L_{bce} + L_{cl},$$ Equation 5 wherein $L_{bce}$ denotes the binary cross-entropy loss computed on the output saliency map and the ground truth mask.

In the training state, the positives and negatives for the contrastive loss are sampled from the same video as the anchor in the minibatch. The contrastive loss is computed on multiple frames for aggregating global information in videos so as to learn contrastive features in both spatial and temporal dimensions. During testing, only the current frame may be taken as input in the VSOD model, which is more efficient than existing temporal modeling techniques.

In an embodiment, the at least one encoder 304 may be a fully convolutional neural network, such as the fully convolutional DeepLabv3. The fully convolutional neural network may include the first five convolution blocks from ResNet-101 and an atrous spatial pyramid pooling (ASPP) model. Each of the output saliency maps 324a-n may be bilinearly up-sampled by a factor of 8 to the size of the input video frame, which may lose detailed information. In order to capture detailed boundaries of objects, instead of directly up-sampling the saliency maps 324a-n to the target size, the spatial information may be gradually recovered with skip connections from low-level features. For example, the map may be up-sampled three times, each time by a factor of two. The low-level feature map of the same spatial size as the current salient map is fed into a convolutional layer to produce a pixel-wise prediction. The generated prediction is then added to the current salient map.

The low level feature, such as the feature 308, extracted from each input frame and used in the cross-level co-attention model 314 may be from the final convolutional layer of the first block in ResNet-101, and the high level feature, such as the feature 306, used in both self-attention model 310 and co-attention model 314 may be from the final convolutional layer of the fourth block in ResNet-101. In the contrastive learning model 322, the foreground region feature vector 326, the positive sample 328, and the negative sample 330 may be features before the final output layer. In contrastive loss, the temperature is set to 0.1. For each anchor (e.g. foreground region feature vector 326) four positive and four negative samples may be used for optimization. Multi-scale interference and instance pruning may be applied during the testing stage. The VSOD model may be implemented, for example, in PyTorch with the SGD optimizer. The batch size may be set to 8 and the learning rate may be set to 10e-4.

Figure 4:
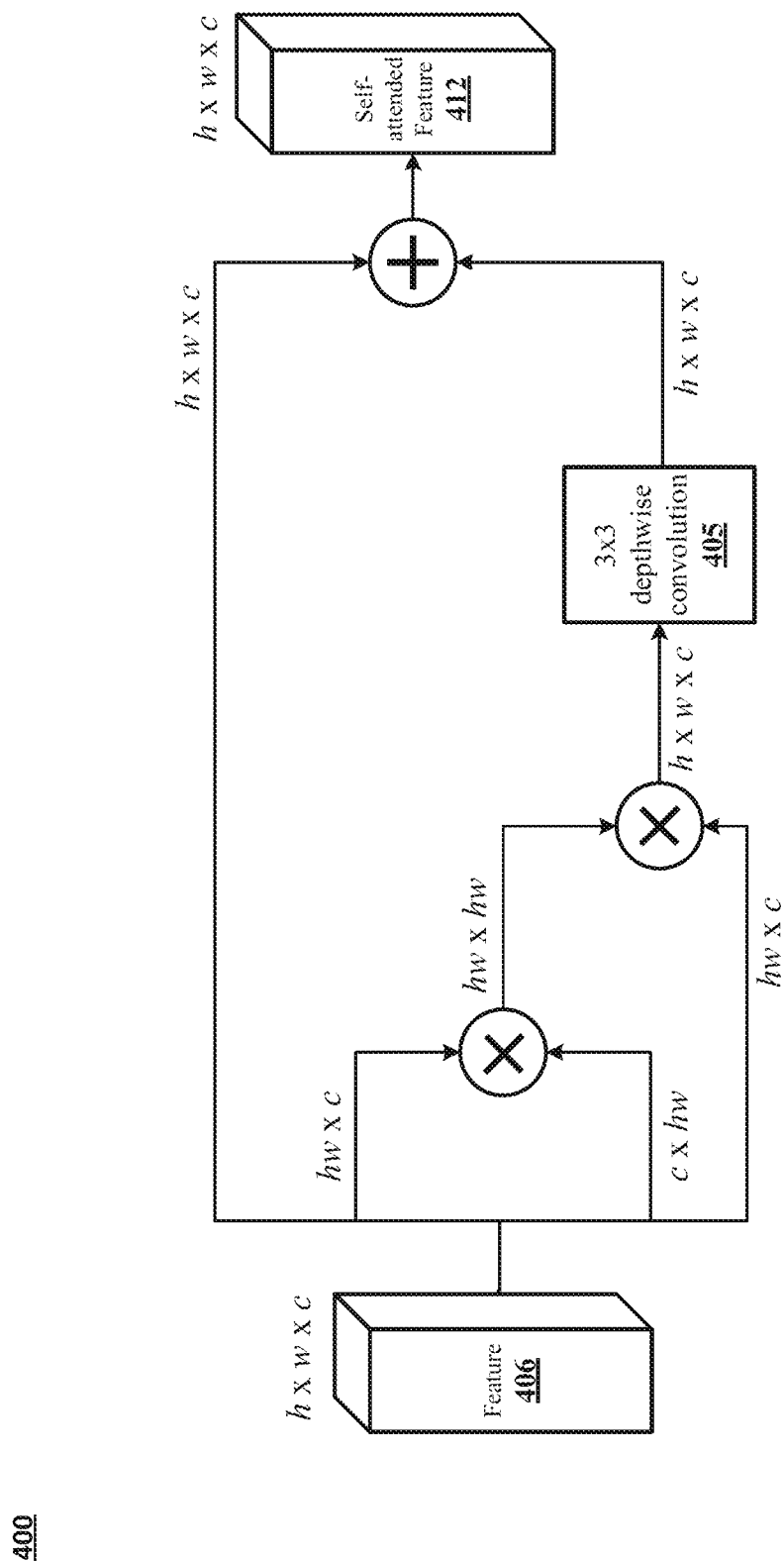
FIG. 4 shows another example system for detecting objects in a video.

As discussed above, in an embodiment, the self-attention model 310 is a non-local self-attention sub-network configured to find correlations between all positions in a particular video frame. A framework 400 for an exemplary non-local self-attention sub-network configured to find correlations between all positions in a particular video frame is illustrated in FIG. 4. The framework 400 illustrates various operations taken by the non-local self-attention sub-network to generate a self-attentive feature 412. The framework 400 illustrates the input shape(s) for each operation performed by the non-local self-attention sub-network. The operations performed by the non-local self-attention sub-network include matrix multiplication and element-wise summation, with ⊗ representative of matrix multiplication and ⊕ representative of element-wise summation.

The non-local self-attention sub-network may receive, as input, an extracted feature representation 406. The extracted feature representation 406 may be a high-level extracted feature, such as the high-level extracted feature 306. The extracted feature representation 406 may be received, for example, from a feature encoder (e.g. at least one feature encoder 304) configured to extract features from images or video frames. The non-local self-attention sub-network may utilize the extracted feature representation 406 to determine and output a self-attentive feature 412. The self-attentive feature 412 may be the same as, for example, the attentive feature 312.

To generate the self-attentive feature 412, the non-local self-attention sub-network may find correlations between all positions in a particular video frame. To find correlations between all positions in a particular video frame, the non-local self-attention sub-network may directly compute the relationship(s) between any two positions in the video frame from which the feature representation 406 was extracted. For example, if x represents the extracted feature representation 406 from a video frame, the following non-local operation may be performed by the non-local self-attention sub-network:

$$y_i = \frac{1}{C(x)} \sum_{\forall j} f(x_i, x_j) g(x_j),$$ Equation 6 wherein i is the index of an output position, j enumerates all possible positions in x, $f(x_i, x_j)$ represents the affinity matrix between $x_i$ and its context features $x_j$, $g(x_j)$ represents a computation of a representation of the feature as position j, and C(x) is a normalization factor. x may be of a shape (h, w, c), where h, w, and c denote the height, width, and number of channels, respectively.

Equation 6 may be wrapped into a non-local block with a residual connection, such as the following residual connection:

$$z_i = W_z y_i + x_i,$$ Equation 7 wherein $W_z$ is a learnable matrix for feature transformation. The functions f(·,·) and g (·) may be a variety of different functions. For example, a dot product may be applied for f(·,·) and a linear embedding (e.g. 1×1 convolution) may be applied for g(·). As a result, Equation 6 may be rewritten as the following:

$$y = \frac{1}{C(x)} \theta(x) \emptyset(x)^T g(x),$$ Equation 8 wherein θ(·), Ø, and g (·) are 1×1 convolutional layers with c channels, and T represents the transpose operation. The outputs of the convolutional layers may be reshaped to (h×w, c) before matrix multiplications are performed. The normalization factor C(x) may be set as N, which is the number of positions in x. A lightweight version of non-local networks may be employed, where the feature transformations θ(·), Ø(·), and g(·) are shared and integrated into the feature extractor that produces x. Accordingly, Equation 8, as simplified is:

$$y = \frac{1}{N} x x^T x,$$ Equation 9 wherein T represents a transpose operation, and N represents a normalization factor indicating a number of locations in the high-level feature x.

The feature transformation $W_z$ in Equation 7 may be instantiated as a 1×1 convolutional layer. However, this may be a heavy computation. The 1×1 convolution may be replaced with a 3×3 depth wise convolution 405 for higher efficiency. Equation 7 may then be rewritten as follows:

$$z_{self-attn} = \text{DepthwiseConv}(y, W_d) + x,$$ Equation 10 wherein $z_{self-attn}$ represents the non-local self-attentive feature, x represents a high-level feature extracted from the particular frame, $W_d$ represents a depthwise convolution kernel, and y represents a non-local operation computed based on Equation 9

$$y = \frac{1}{N} x x^T x.$$

Figure 5:
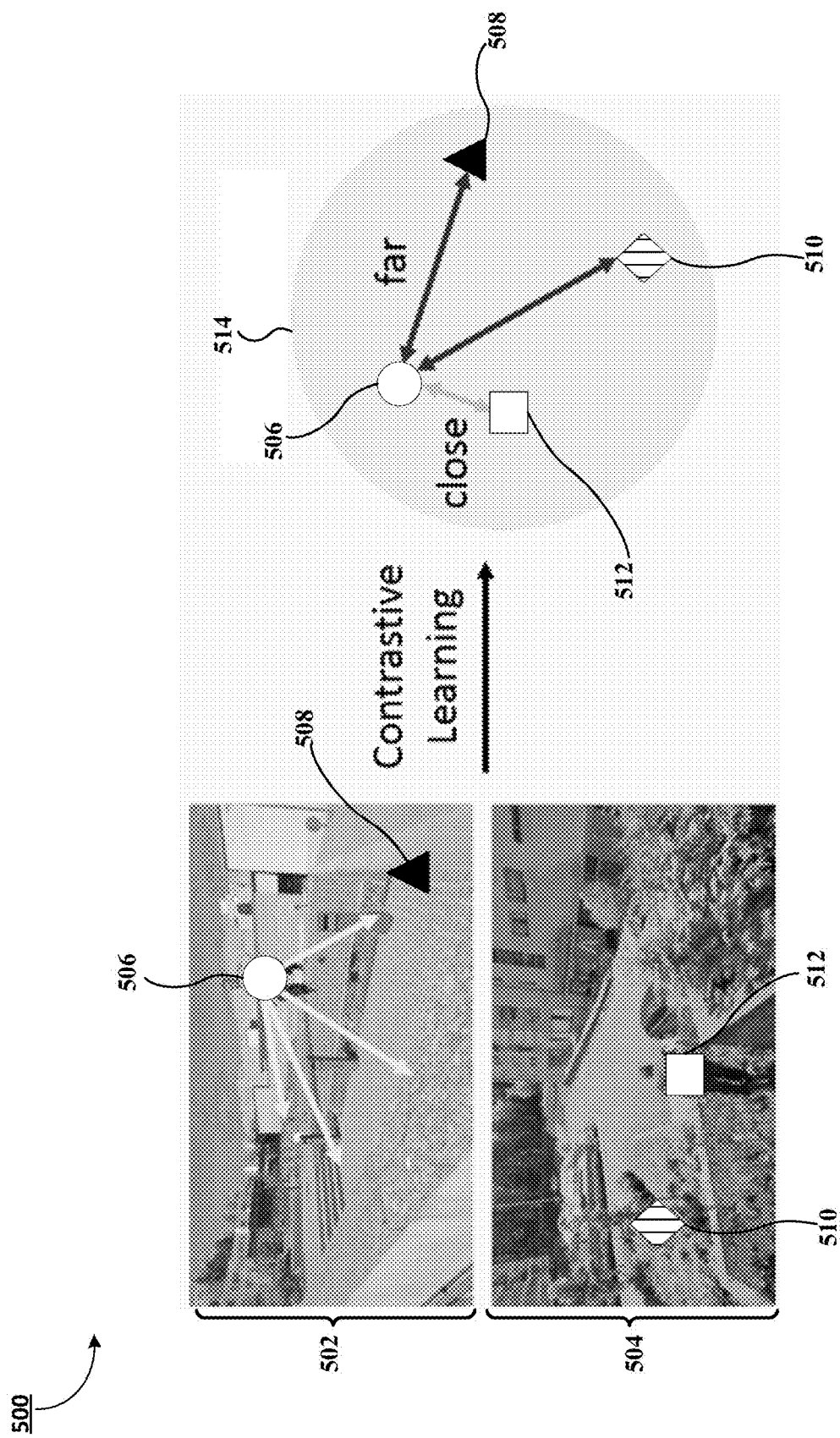
FIG. 5 shows another example system for detecting objects in a video.

FIG. 5 illustrates an overview 500 of an exemplary algorithm utilized by a VSOD model, such as the VOD model described above with respect to FIGS. 1-3. The algorithm may utilize a non-local self-attention model (e.g. self-attention 310, 400). The non-local self-attention model is represented by the arrows in the overview 500. The non-local self-attention model may be utilized to capture the long-range (e.g. long distance) dependencies or correspondence in each of a plurality of video frames 502, 504 by directly computing the interactions or correlations between any two positions in a particular video frame. For example, the non-local self-attention model may compute the features of a location upon all the other locations in each video frame of the plurality of video frames 502, 504. The non-local self-attention model may capture the long-range (e.g. long distance) dependencies or correspondence in each video frame in order to generate a self-attentive feature for that video frame (e.g. self-attentive feature 412).

The algorithm may utilize a co-attention model (e.g. co-attention 314) configured to receive both high-level feature representations (e.g. high-level extracted feature representation 306) and low-level feature representations (e.g. low-level extracted feature representation 308) extracted from each of the plurality of video frames 502, 504. The co-attention model may utilize the high-level extracted feature representation and the low-level extracted feature representation from each of the plurality of video frames 502, 504 to determine and output an attentive feature 316. The co-attention model may be configured to detect the salient object(s) in a video using high-level semantic features while keeping the details from low-level features.

The algorithm may utilize a contrastive learning model (e.g. contrastive learning 322) in order to learn contrastive features from each of the plurality of video frames 502, 504. For each foreground region anchor in a video frame, foreground regions from the same video frame may be selected as positive samples and background regions may be selected as negative samples. In the overview 500, the foreground region anchor is represented by a circle 506, a positive sample is represented by a square 512, and negative samples are represented by a triangle 508 and a diamond 510. The contrastive loss is optimized to encourage the anchor, as represented by the circle 506, to embed near positive samples, as represented by the square 512, and far away from negative samples, as represented by the triangle 508 and the diamond 510, in a feature space 514. With the positive and negative samples chosen from the whole video (e.g. frames from the entire video), the contrastive learning model may improve both intra-frame discriminability and inter-frame consistency. The algorithm may output one or more saliency maps (e.g. saliency maps 324a-n). Each saliency map may correspond to a particular video frame.

Figure 6:
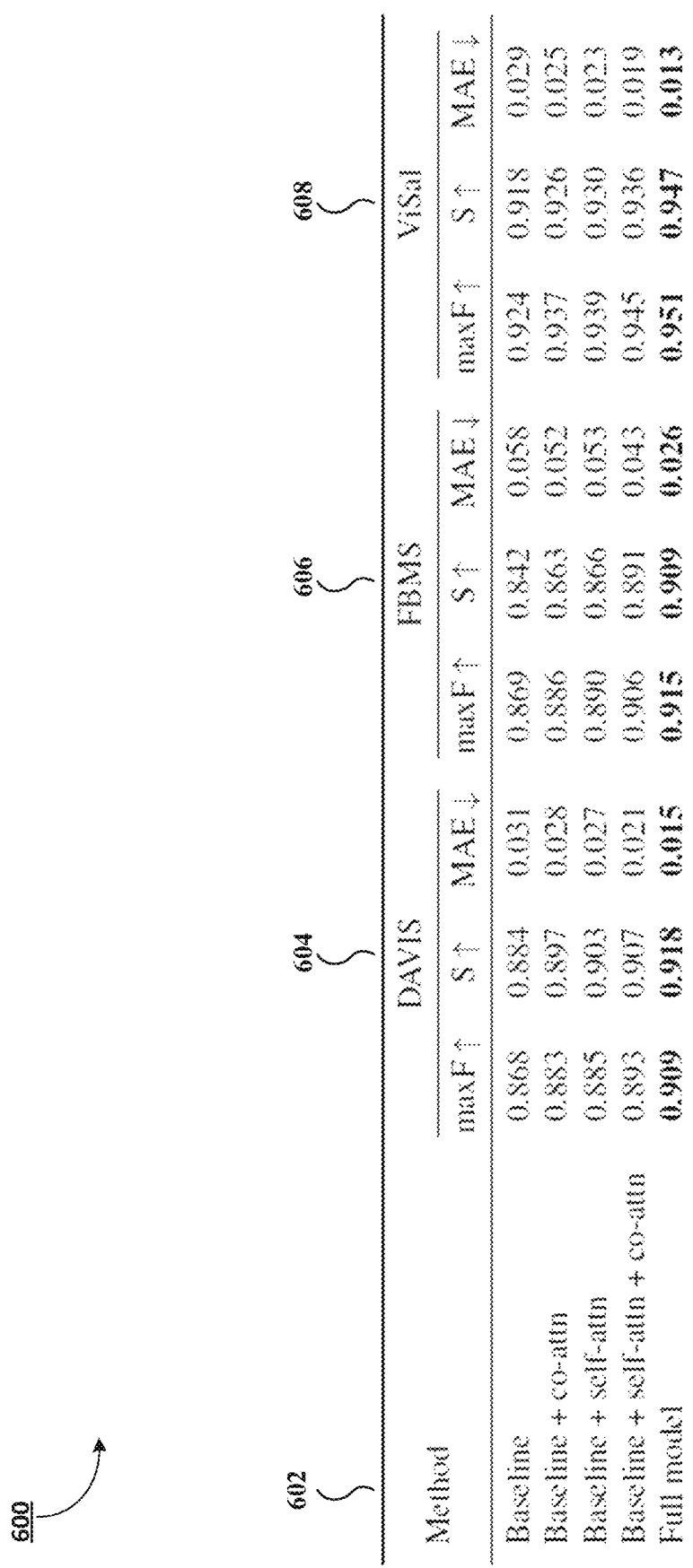
FIG. 6 shows an example table illustrating the performance of the techniques described in the present disclosure.

Each component in the above described framework for VSOD (e.g. framework 300) increases the effectiveness of the above-described VSOD model. For example, the performance of the VSOD model improves when each component is integrated into the framework. FIG. 6 illustrates a table 600 depicting an ablation study of the above described framework for VSOD. The table 600 indicates various methods 602. The methods 602 indicated by the table 600 include "baseline," "baseline+co-attention," "baseline+self-attention," "baseline+self-attention+co-attention," and "full model." The "baseline model" is a VSOD model that does not include either of the attention models or the contrastive loss. The "baseline+co-attention" model is a VSOD model that includes the co-attention model, but not the self-attention model or the contrastive loss. The "baseline+self-attention" model is a VSOD model that includes the self-attention model, but not the co-attention model or the contrastive loss. The "baseline+self-attention+co-attention" model is a VSOD model that includes both the self-attention model and the co-attention model, but not the contrastive loss. Finally, the "full model" is a VSOD model that includes all of the attention model, co-attention model, and the contrastive loss.

The table 600 indicates the performance of each of the methods 602 for a plurality of benchmark datasets. The first benchmark dataset is the DAVIS dataset 604. The DAVIS dataset is a benchmark for video object segmentation. The DAVIS dataset includes thirty videos for training and twenty videos for validation. Pixel-wise annotations per frame are provided in the dataset. The second benchmark dataset is the FBMS dataset 606. The FBMS dataset 606 is another benchmark for video object segmentation. It includes twenty-nine training videos and thirty testing videos. The video sequences are sparsely labeled (only 720 frames are annotated). The third benchmark dataset is the ViSal dataset 608. The ViSal dataset 608 is a VSOD dataset that includes seventeen video sequences. There are 193 frames manually annotated in the ViSal dataset 608.

For each of the benchmark datasets 604, 606, 608, three different performance metrics are evaluated. The three different performance metrics included in the table 600 are the F-measure, S-measure, and Mean Absolute Error (MAE). The F-measure is computed upon the precision and recall:

$$F_\beta = \frac{(1+\beta^2) \times \text{precision} \times \text{recall}}{\beta^2 \times \text{precision} + \text{recall}},$$ Equation 11 where $\beta^2$ is set to 0.3. The S-measure evaluates the object aware $S_o$ and region aware $S_r$ structural similarity between the saliency map and the group truth mask:

$$S = \alpha S_o + (1-a) S_r,$$ Equation 12 where $\alpha$ is set to 0.5 The MAE measure the average of pixel-wise difference between the saliency map and the ground truth mask:

$$MAE = \frac{\sum_{i=1}^{H} \sum_{j=1}^{W} |P(i,j) - G(i,j)|}{H \times W},$$ Equation 13 where H and W are the height and width of the image.

The table 600 indicates that, for each dataset 504, 506, 508, integrating either the co-attention model or the self-attention model into the VSOD model improves performance of the VSOD model from the baseline. The table 600 also indicates that, for each dataset 504, 506, 508, integrating both the co-attention model and the self-attention model further improves the performance of the VSOD model. This indicates the benefits of aggregating features from two different perspectives. The table 600 also indicates that, for each dataset 504, 506, 508, integrating both attention models and the contrastive loss allows the VSOD model to achieve the best performance. This indicates that the contrastive learning model helps the VSOD model to learn better feature representations for VSOD.

The VSOD model described above in FIGS. 1-4 performs better than existing VSOD models. For example, the VSOD model described above is able to generate results with better intra-frame discriminability and inter-frame consistency in a more efficient manner than existing VSOD models. FIG. 7 illustrates a table 700 depicting a comparison of the performance of the VSOD model described above with the performance of a plurality of existing VSOD methods 702. The top group 710 of existing VSOD methods includes image-based VSOD approaches and the bottom group 712 of existing VSOD method includes video-based methods.

The table 700 indicates a comparison of the performance of the VSOD model described above with the performance of the existing VSOD models 702 for a plurality of benchmark datasets. The first benchmark dataset is the DAVIS dataset 704. The DAVIS dataset is a benchmark for video object segmentation. The DAVIS dataset includes thirty videos for training and twenty videos for validation. Pixel-wise annotations per frame are provided in the dataset. The second benchmark dataset is the FBMS dataset 706. The FBMS dataset 706 is another benchmark for video object segmentation. It includes twenty-nine training videos and thirty testing videos. The video sequences are sparsely labeled (only 720 frames are annotated). The third benchmark dataset is the ViSal dataset 708. The ViSal dataset 708 is a VSOD dataset that includes seventeen video sequences. There are 193 frames manually annotated in the ViSal dataset 708.

The table 700 indicates that the bottom group 712 of existing VSOD models generally perform better than the top group 710 of existing VSOD models, as the image-based approaches do not consider temporal correspondence. Compared to video-based methods that model the temporal information by optical flow, ConvLSTM, or computing the relationships of the current frame and one or multiple reference frames, the VSOD model described above (represented by the last tow in the table 700) achieves higher performance without the time-consuming temporal modeling techniques. Because contrastive features are learned from the entire video, the VSOD model described above is able to generate better results with better intra-frame discriminability and inter-frame consistency in a more efficient way. The table 700 indicates that the VSOD model described above performs better than the existing VSOD models on all three of the benchmark datasets 702, 704, 708.

Figure 8:
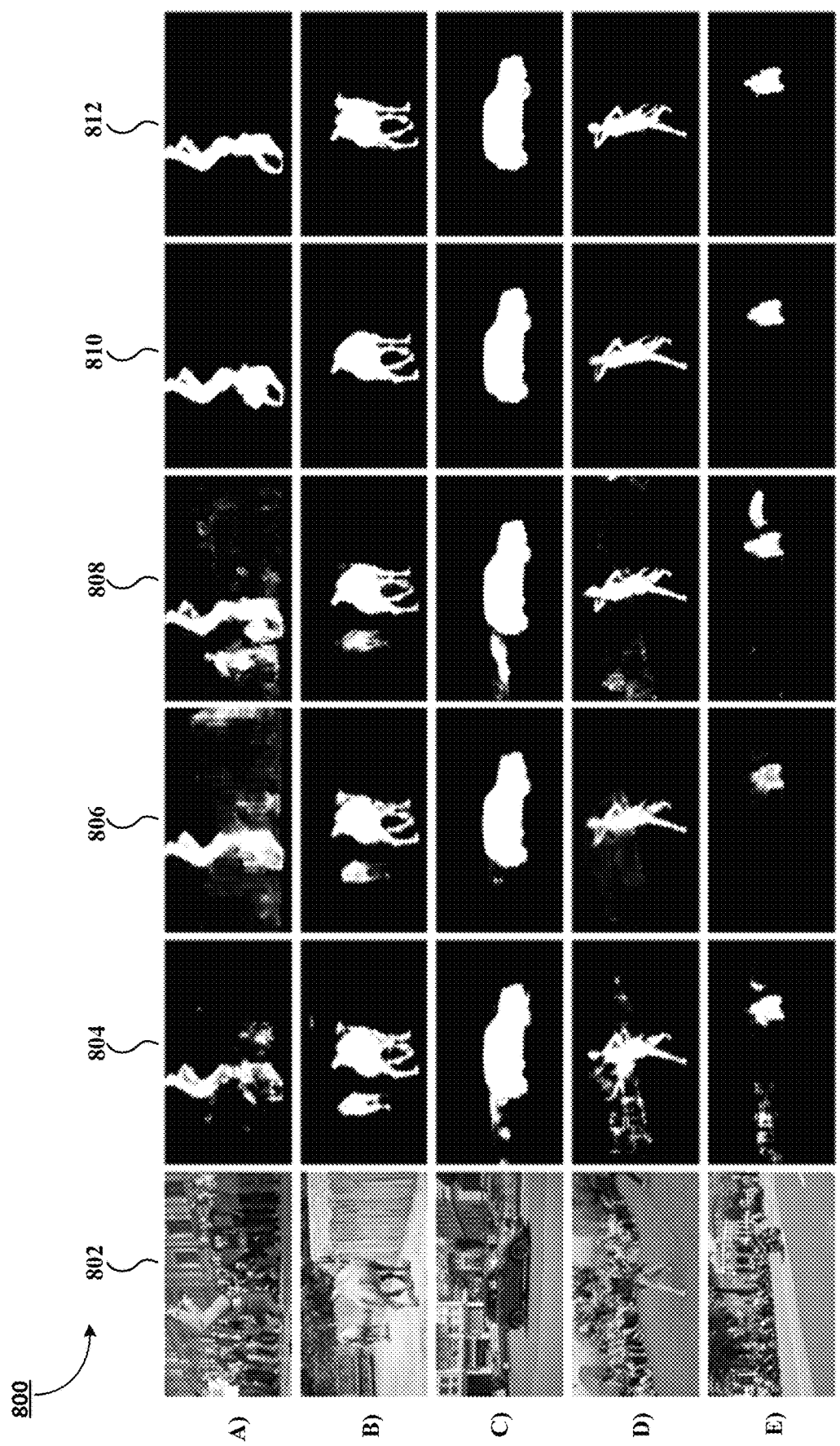
FIG. 8 shows an example set of representations of objects detected in a video.

The output of the above described framework for VSOD (e.g. framework 300) is more accurate and detailed than the output of other existing VSOD models. For example, the saliency maps (e.g. saliency maps 324a-n) output by the above described VSOD model are more accurate and detailed than saliency maps output by other existing VSOD models. FIG. 8 illustrates a table 800 depicting a visual comparison between the output of the above described VSOD model and the output of other existing VSOD models. The table 800 indicates a visual comparison between the output of the above described VSOD model and the output of other existing VSOD models on a benchmark dataset, such as the DAVIS dataset described above.

The table 800 illustrates exemplary saliency maps that may be output from a variety of different VSOD models, including the above described VSOD model. The table 800 indicates a plurality of input video frames in column 802. Each of columns 804, 806, and 808 are associated with a particular existing VSOD model. For example, column 804 indicates the output from a first existing VSOD model (e.g. PDB model), column 806 indicates the output from a second existing VSOD model (e.g. SSAV model), and column 808 indicates the output from a third existing VSOD model (e.g. MGA model). Column 810 indicates the output from the above described framework for VSOD (e.g. framework 300). Column 812 indicates the ground truth masks (GT masks). Each row A-E in the table 800 indicates an exemplary saliency map output from each of the VSOD models 804, 806, 808, and 810 based on a different input video frame. Each row A-E also indicates the GT mask for the input video frame associated with that particular row.

The table 800 illustrates that the output from the above described framework for VSOD (e.g. framework 300), as depicted in column 810, is more accurate and contains more details than the output from the other models, as depicted in columns 804, 806, and 808. For example, each of the saliency maps indicated in column 810 more closely resemble their respective GT masks than the saliency maps indicated in the columns 804, 806, and 808. The saliency maps indicated in the columns 804, 806, and 808 contain background regions or lose the information near the boundaries of the salient object.

As described above, VSOD may be useful for a variety of tasks, including video object segmentation. The VSOD model described above in FIGS. 1-4 performs better on video object segmentation tasks than existing video object segmentation models. FIG. 9 illustrates a table 900 depicting a comparison of the performance of the VSOD model described above on the unsupervised video object segmentation task with the performance of a plurality of existing unsupervised video object segmentation methods. The plurality of existing unsupervised video object segmentation methods are indicated in the column 902. The above described VSOD model is also indicated in the last row of column 902 (e.g. "ours").

The table 900 indicates a comparison of the performance of the VSOD model described above on the unsupervised video object segmentation task with the performance of the plurality of existing unsupervised video object segmentation methods for a benchmark dataset 904. The benchmark dataset 904 may be, for example, the DAVIS dataset described above. The DAVIS dataset may include the regions similarity J, which is the intersection-over-union between the prediction and ground truth, and the boundary accuracy F, which is the F-measure defined on the boundary points.

To capture temporal cues, prior unsupervised video object segmentation methods employ optical flow, ConvLSTM, graph neural networks, or calculate the correlation between the current frame and other reference frames. These existing techniques for modeling temporal information usually involve a high computational cost. The VSOD model described above adopts a more efficient technique by learning contrastive features across video frames. As depicted in the last row of the table 900, the VSOD model described above outperforms most existing methods by significant margins and is competitive with the DFNet scheme. However, the DFNet scheme uses multiple frames as input during testing, which may require additional computation. By contrast, the VSOD model described above does not utilize information from other frames in the testing stage. As a result, the VSOD model described above is more efficient.

Figure 10:
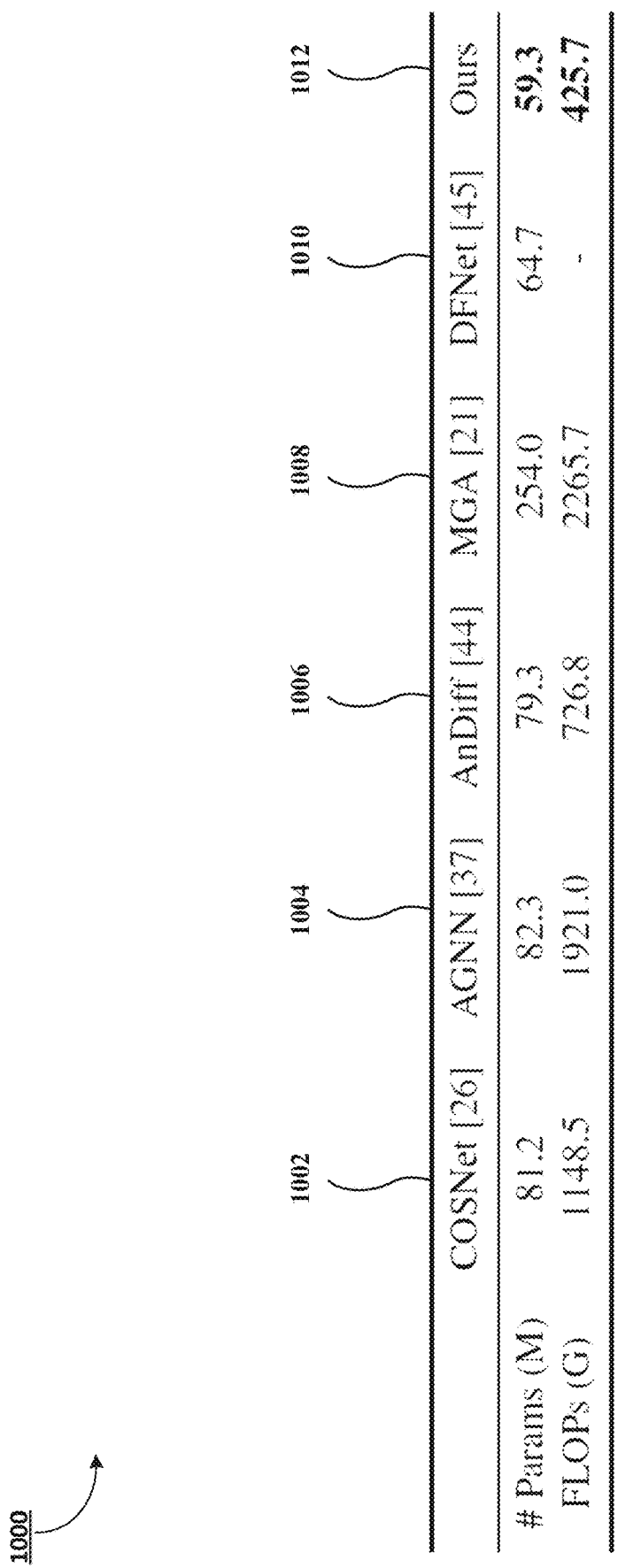
FIG. 10 shows an example table illustrating a comparison of the computational cost associated with various techniques, including techniques in accordance with the present disclosure.

The above described framework for VSOD (e.g. framework 300) is more efficient than other existing VSOD models. For example, above described framework for VSOD involves less computational complexity than other VSOD models. FIG. 10 illustrates a table 1000 depicting a comparison between the computational complexity of the above described VSOD model and that of other existing VSOD models. The table 1000 indicates a comparison between the computational complexity of the above described VSOD model in the column 1012, and the computational complexity of other existing VSOD models in columns 1002, 1004, 1006, and 1008.

The table 1000 indicates the number of parameters and the number of floating-point operations (FLOPs) for each of the existing VSOD models in columns 1002, 1004, 1006, and 1008 and the above described VSOD model in the column 1012. Compared to the existing models in columns 1002, 1004, 1006, and 1008, the above described VSOD model in the column 1012 has the fewest parameters. The table 1000 indicates that the AGNN model in the column 1004 has significantly high computational complexity due to due usage of graph neural networks. The COSNet and AnDiff models in the columns 1002 and 1006, respectively, take one or multiple additional frames as reference to generate the output. As a result, they also involve high computational cost. Similar to the COSNet and AnDiff models, DFNet in the column 1010 also adopts multiple frames during interference to capture more information and, as a result, involves a high computational cost. The MGA method in the column 1008 predicts the output from an RBG image and an optical flow map, where the optical flow is estimated by an external model. As the above described VSOD model in the column 1012 only uses the current frame as input and does not employ optical flow during interference, the computation is more efficient than the other methods and is associated with a lower computational cost.

Figure 11:
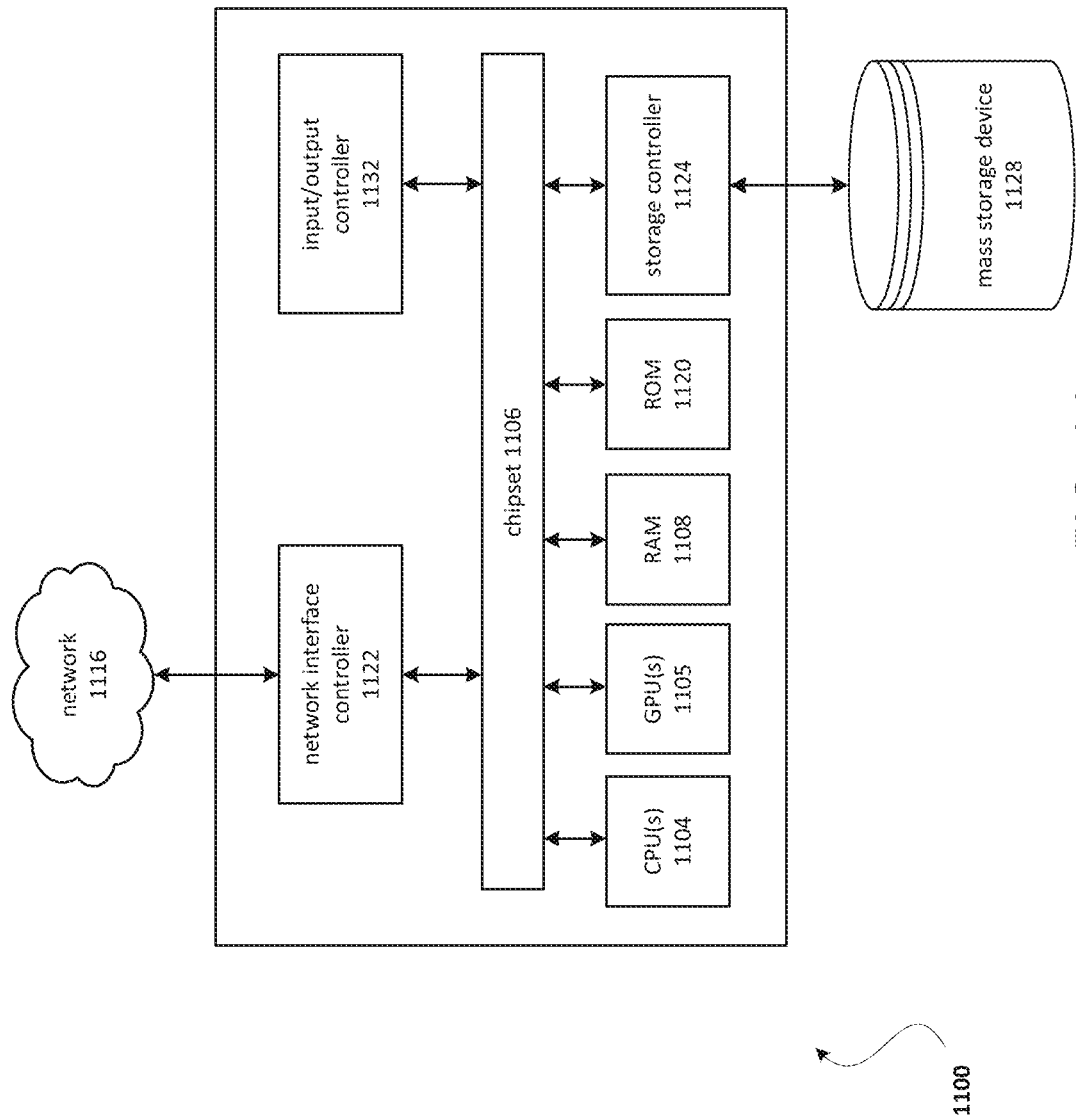
FIG. 11 shows an example computing device which may be used to perform any of the techniques disclosed herein.

FIG. 11 illustrates a computing device that may be used in various aspects, such as the services, networks, modules, and/or devices depicted in FIG. 1. With regard to the example architecture of FIG. 1, the message service, interface service, processing service, content service, cloud network, and client may each be implemented by one or more instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random-access memory (RAM) 1108 used as the main memory in the computing device 1100. The chipset 1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN). The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. The mass storage device 1128 may comprise a management component 1010. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on the mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
extracting features from each frame of a video, wherein the video comprises a plurality frames;
generating a first attentive feature by applying a first attention model on at least some of features extracted from any particular frame among the plurality of frames, wherein the first attention model identifies correlations between a plurality of locations in the particular frame by computing relationships between any two locations among the plurality of locations;
generating a second attentive feature by applying a second attention model on at least one pair of features at different levels, wherein the at least one pair of features are selected from the features extracted from the particular frame, and wherein the second attention model identifies a correlation between at least one pair of locations corresponding to the at least one pair of features;
generating a representation of an object included in the particular frame based on the at least some of the features extracted from the particular frame, the first attentive feature, and the second attentive feature;
computing a contrastive loss based on a feature associated with a foreground region in the particular frame and multiple features selected among features extracted from the plurality of frames, wherein the multiple features comprise a set of positive samples associated with foreground regions in other frames than the particular frame, wherein the multiple features further comprises a set of negative samples associated with background regions in the plurality of frames, and wherein the contrastive loss is computed based on:

$$L_{cl} = -\log \frac{\sum_{\mu_+ \in Q_+} e^{\mu^T \mu_+/\tau}}{\sum_{\mu_+ \in Q_+} e^{\mu^T \mu_+/\tau} + \sum_{\mu_- \in Q_-} e^{\mu^T \mu_-/\tau}},$$

wherein $L_{cl}$ represents the contrastive loss, $\mu$ represents the feature associated with the foreground region in the particular frame, $Q_+$ represents the set of positive samples, $Q_-$ represents the set of negative samples, $\mu_+$ represents a positive sample, $\mu_-$ represents a negative sample, and $\tau$ represents a temperature parameter; and
applying the contrastive loss before outputting the representation of the object included in the particular frame.

2. The method of claim 1, wherein the first attention model is a non-local self-attention model, wherein the first attentive feature is a non-local self-attentive feature, and wherein the first attentive feature is determined based at least in part on a non-local operation using a depth-wise convolution.

3. The method of claim 2, wherein the non-local self-attentive feature is computed based on $z_{self-attn} = \text{DepthwiseConv}(y, W_d) + x$,
wherein $z_{self-attn}$ represents the non-local self-attentive feature, x represents a high-level feature extracted from the particular frame, $W_d$ represents a depthwise convolution kernel, and y represents the non-local operation computed based on $$y = \frac{1}{N} xx^T x,$$

wherein T represents a transpose operation, and N represents a normalization factor which is a number of locations in the high-level feature x.

4. The method of claim 1, wherein the second attention model is a cross-level co-attention model, wherein the second attentive feature is a cross-level co-attentive feature, and wherein the second attentive feature is determined based at least in part on a learnable weight matrix.

5. The method of claim 4, wherein the cross-level co-attentive feature is computed based on $z_{co-attn} = \text{softmax}(A)x,$ wherein the $z_{co-attn}$ represents the cross-level co-attentive feature, x represents a high-level feature among a pair of features, and A represents the affinity matrix computed based on $A = vWx^T$,
wherein v represents a low-level feature among the pair of features, W represents the learnable weight matrix, T represents a transpose operation, and each entry of the affinity matrix A indicates a similarity between a pair of locations corresponding to the pair of features.

6. The method of claim 1, wherein the first attentive feature and the second attentive feature are weighted by an operation, respectively, wherein the operation is formulated as $f_g = \sigma(W_g z + b_g)$,
wherein $f_g$ represents a weight of the first attentive feature or the second attentive feature, σ represents a sigmoid function with an output range [0, 1], $W_g$ represents a weight of a convolutional layer, and $b_g$ represent a bias of the convolutional layer.

7. A system, comprising:
at least one processor; and
at least one memory communicatively coupled to the at least one processor and storing instructions that upon execution by the at least one processor cause the system to perform operations, the operations comprising:

extracting features from each frame of a video, wherein the video comprises a plurality frames;

generating a first attentive feature by applying a first attention model on at least some of features extracted from any particular frame among the plurality of frames, wherein the first attention model identifies correlations between a plurality of locations in the particular frame by computing relationships between any two locations among the plurality of locations;

generating a second attentive feature by applying a second attention model on at least one pair of features at different levels, wherein the at least one pair of features are selected from the features extracted from the particular frame, and wherein the second attention model identifies a correlation between at least one pair of locations corresponding to the at least one pair of features;

generating a representation of an object included in the particular frame based on the at least some of the features extracted from the particular frame, the first attentive feature, and the second attentive feature;

computing a contrastive loss based on a feature associated with a foreground region in the particular frame and multiple features selected among features extracted from the plurality of frames, wherein the contrastive loss is computed based on:

$$L_{cl} = -\log \frac{\sum_{\mu_+ \in Q_+} e^{\mu^T \mu_+ /\tau}}{\sum_{\mu_+ \in Q_+} e^{\mu^T \mu_+ /\tau} + \sum_{\mu_- \in Q_-} e^{\mu^T \mu_- /\tau}},$$

wherein $L_{cl}$ represents the contrastive loss, $\mu$ represents the feature associated with a foreground region in the particular frame, $Q_+$ represents a set of positive samples associated with foreground regions in other frames than the particular frame, $Q_-$ represents a set of negative samples associated with background regions in the plurality of frames, $\mu_+$ represents a positive sample, $\mu_-$ represents a negative sample, and $\tau$ represents a temperature parameter; and applying the contrastive loss before outputting the representation of the object included in the particular frame.

8. The system of claim 7, wherein the first attentive feature is a non-local self-attentive feature, and the non-local self-attentive feature is computed based on $z_{self-attn} = \text{DepthwiseConv}(y, W_d) + x$, wherein $z_{self-attn}$ represents the non-local self-attentive feature, x represents a high-level feature extracted from the particular frame, $W_d$ represents a depthwise convolution kernel, and y represents a non-local operation computed based on $$y = \frac{1}{N} xx^T x,$$

wherein T represents a transpose operation, and N represents a normalization factor which is a number of locations in the high-level feature x.

9. Wherein the second attentive feature is a cross-level co-attentive feature, and the cross-level co-attentive feature is computed based on $z_{co-attn} = \text{softmax}(A)x$, wherein the $z_{co-attn}$ represents the cross-level co-attentive feature, x represents a high-level feature among a pair of features, and A represents an affinity matrix computed based on $A = vWx^T$, wherein v represents a low-level feature among the pair of features, W represents a learnable weight matrix, T represents a transpose operation, and each entry of the affinity matrix A indicates a similarity between a pair of locations corresponding to the pair of features.

10. The system of claim 7, wherein the first attentive feature and the second attentive feature are weighted by an operation, respectively, wherein the operation is formulated as $f_g = \sigma(W_g z + b_g)$, wherein $f_g$ represents a weight of the first attentive feature or the second attentive feature, $\sigma$ represents a sigmoid function with an output range [0,1], $W_g$ represents a weight of a convolutional layer, and $b_g$ represent a bias of the convolutional layer.

11. A non-transitory computer-readable storage medium, storing computer-readable instructions that upon execution by a processor cause the processor to implement operations, the operation comprising:

generating a first attentive feature by applying a first attention model on at least some of features extracted from any particular frame among the plurality of frames, wherein the first attention model identifies correlations between a plurality of locations in the particular frame by computing relationships between any two locations among the plurality of locations;

generating a second attentive feature by applying a second attention model on at least one pair of features at different levels, wherein the at least one pair of features are selected from the features extracted from the particular frame, and wherein the second attention model identifies a correlation between at least one pair of locations corresponding to the at least one pair of features;

generating a representation of an object included in the particular frame based on the at least some of the features extracted from the particular frame, the first attentive feature, and the second attentive feature;

computing a contrastive loss based on a feature associated with a foreground region in the particular frame and multiple features selected among features extracted from the plurality of frames, wherein the contrastive loss is computed based on:

$$L_{cl} = -\log \frac{\sum_{\mu_+ \in Q_+} e^{\mu^T \mu_+ /\tau}}{\sum_{\mu_+ \in Q_+} e^{\mu^T \mu_+ /\tau} + \sum_{\mu_- \in Q_-} e^{\mu^T \mu_- /\tau}},$$

wherein $L_{cl}$ represents the contrastive loss, $\mu$ represents the feature associated with a foreground region in the particular frame, $Q_+$ represents a set of positive samples associated with foreground regions in other frames than the particular frame, $Q_-$ represents a set of negative samples associated with background regions in the plurality of frames, $\mu_+$ represents a positive sample, $\mu_-$ represents a negative sample, and $\tau$ represents a temperature parameter; and applying the contrastive loss before outputting the representation of the object included in the particular frame.

12. The non-transitory computer-readable storage medium of claim 11, wherein the first attentive feature is a non-local self-attentive feature, and the non-local self-attentive feature is computed based on $z_{self-attn} = \text{DepthwiseConv}(y, W_d) + x,$ wherein $z_{self-attn}$ represents the non-local self-attentive feature, x represents a high-level feature extracted from the particular frame, $W_d$ represents a depthwise convolution kernel, and y represents a non-local operation computed based on $$y = \frac{1}{N} x x^T x,$$

wherein T represents a transpose operation, and N represents a normalization factor which is a number of location in the high level feature x.

13. The non-transitory computer-readable storage medium of claim 11, wherein the second attentive feature is a cross-level co-attentive feature, and the cross-level co-attentive feature is computed based on $z_{co-attn} = \text{softmax}(A)x$, wherein the $z_{co-attn}$ represents the cross-level co-attentive feature, x represents a high-level feature among a pair of features, and A represents an affinity matrix computed based on $A = vWx^T$, wherein v represents a low-level feature among the pair of features, W represents a learnable weight matrix, T represents a transpose operation, and each entry of the affinity matrix A indicates a similarity between a pair of locations corresponding to the pair of features.

* * * * *